(12) United States Patent
Choi et al.

(10) Patent No.: US 7,239,728 B1
(45) Date of Patent: Jul. 3, 2007

(54) FINGERPRINT RECOGNIZING DISPLAY AND OPERATING METHOD THEREOF

(75) Inventors: Young Hun Choi, Suwon (KR); Jong Hwa Shin, Yongin (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 790 days.

(21) Appl. No.: 09/671,671

(22) Filed: Sep. 28, 2000

(30) Foreign Application Priority Data

Nov. 8, 1999 (KR) .......................... 10-1999-49230

(51) Int. Cl.
*G06H 9/00* (2006.01)

(52) U.S. Cl. ...................................... 382/124; 382/116

(58) Field of Classification Search ........ 382/115–127; 356/71; 340/5.8, 5.83; 345/156, 173; 713/186
See application file for complete search history.

(56) References Cited

U.S. PATENT DOCUMENTS

| | | | | |
|---|---|---|---|---|
| 4,641,350 A | * | 2/1987 | Bunn | 382/124 |
| 4,752,966 A | * | 6/1988 | Schiller | 382/125 |
| 5,210,797 A | * | 5/1993 | Usui et al. | 382/126 |
| 5,420,936 A | | 5/1995 | Fitzpatrick et al. | |
| 5,446,290 A | * | 8/1995 | Fujieda et al. | 250/556 |
| 5,623,552 A | * | 4/1997 | Lane | 382/124 |
| 5,680,205 A | * | 10/1997 | Borza | 356/71 |
| 5,828,773 A | * | 10/1998 | Setlak et al. | 382/126 |
| 5,838,306 A | | 11/1998 | O'Connor et al. | |
| 5,854,891 A | * | 12/1998 | Postlewaite et al. | 726/20 |
| 6,021,212 A | * | 2/2000 | Ho | 382/124 |
| 6,141,436 A | * | 10/2000 | Srey et al. | 382/124 |
| 6,181,803 B1 | * | 1/2001 | Davis | 382/115 |
| 6,193,153 B1 | * | 2/2001 | Lambert | 235/380 |
| 6,256,019 B1 | * | 7/2001 | Allport | 345/169 |
| 6,271,745 B1 | * | 8/2001 | Anzai et al. | 340/5.53 |
| 6,314,196 B1 | * | 11/2001 | Yamaguchi et al. | 382/125 |
| 6,327,376 B1 | * | 12/2001 | Harkin | 382/124 |
| 6,400,836 B2 | * | 6/2002 | Senior | 382/124 |

(Continued)

FOREIGN PATENT DOCUMENTS

| | | | | |
|---|---|---|---|---|
| EP | 923018 A2 | * | 6/1999 | |
| JP | 10063844 A | * | 3/1998 | |
| JP | 11262059 A | * | 9/1999 | |
| JP | 2000187420 A | * | 7/2000 | |

(Continued)

OTHER PUBLICATIONS

Korean Office Action of the Korean Patent Application No. 1999-49230, issued on Apr. 19, 2006.

*Primary Examiner*—Matthew C. Bella
*Assistant Examiner*—Patrick Edwards
(74) *Attorney, Agent, or Firm*—Robert E. Bushnell, Esq.

(57) ABSTRACT

A fingerprint recognizing display system including fingerprint recognizing means in a panel of a display apparatus and an operating method thereof, wherein a fingerprint of an user is read and a program supported by a computer is allowed to be operated only if the read fingerprint is registered in fingerprint data of the computer. A display apparatus recognizes a fingerprint of the user through a fingerprint recognizing module included in the display apparatus and outputs recognized fingerprint data by using a communication device included in the fingerprint recognizing module. A computer main body includes a fingerprint data base having data of more than one fingerprint and a fingerprint verifying unit, and operates a program after deciding whether fingerprint data input from the display apparatus is an approved fingerprint through the fingerprint data base and the fingerprint verifying unit.

20 Claims, 8 Drawing Sheets

U.S. PATENT DOCUMENTS

| | | | |
|---|---|---|---|
| 6,401,551 B1 * | 6/2002 | Kawahara et al. | 73/862.337 |
| 6,522,773 B1 * | 2/2003 | Houdeau | 382/124 |
| 6,580,815 B1 * | 6/2003 | Grajewski et al. | 382/124 |
| 6,628,757 B1 * | 9/2003 | Cannon et al. | 379/67.1 |
| 6,775,776 B1 * | 8/2004 | Vogt et al. | 713/186 |
| 2002/0063154 A1 * | 5/2002 | Hoyos et al. | 235/382.5 |

FOREIGN PATENT DOCUMENTS

| | | |
|---|---|---|
| KR | 10-0198112 | 2/1999 |
| KR | 1999-0033423 | 8/1999 |
| KR | 2002061054 A * | 7/2002 |
| WO | WO 200063769 A1 * | 10/2000 |

* cited by examiner

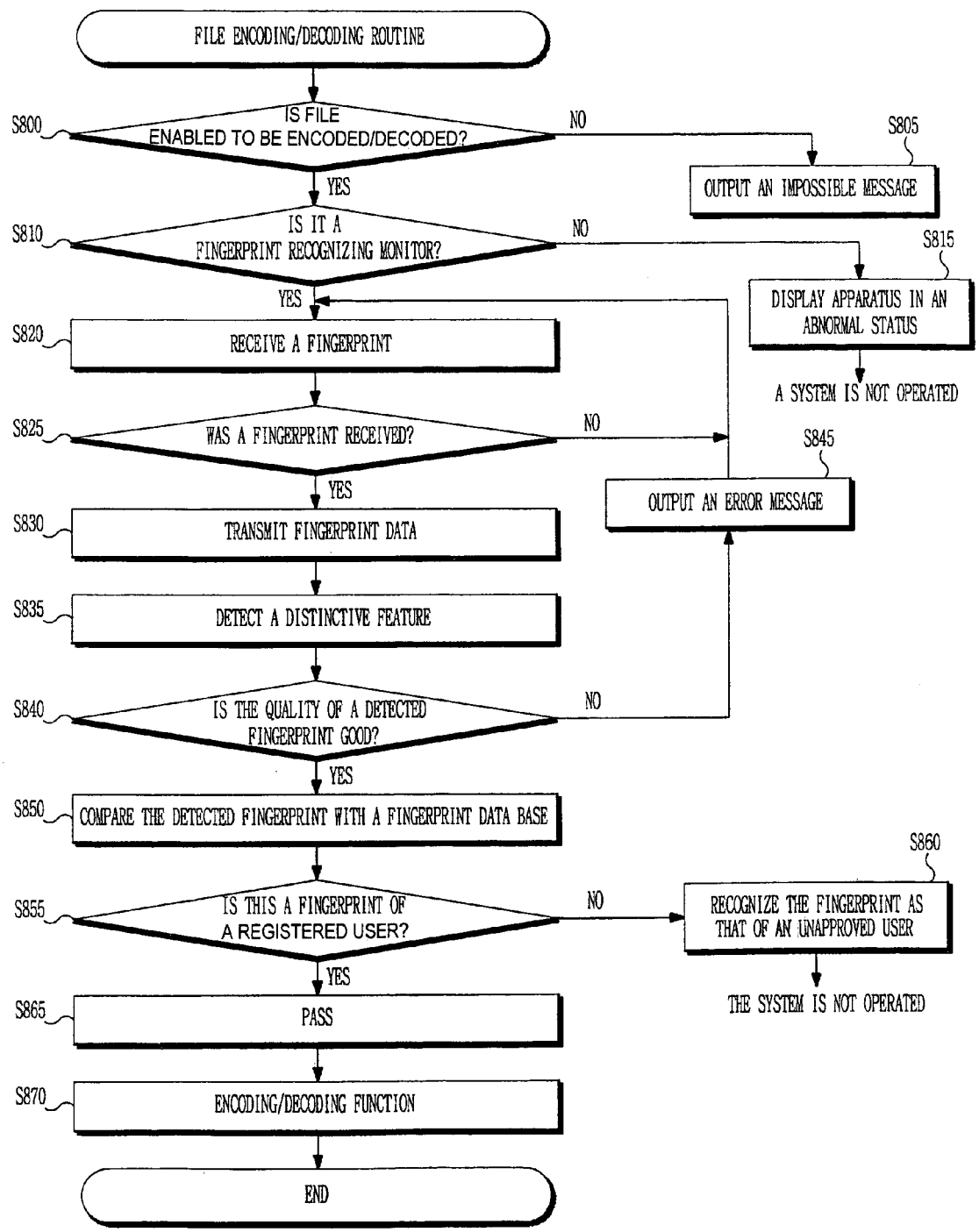

FINGERPRINT RECOGNIZING DISPLAY AND OPERATING METHOD THEREOF

CLAIM OF PRIORITY

This application makes reference to, incorporates the same herein, and claims all benefits accruing under 35 U.S.C § 119 from an application entitled Display System Possible Of Fingerprint Recognition And Operating Method Thereof earlier filed in the Korean Industrial Property Office on 8 Nov. 1999, and there duly assigned Serial No. 99-49230 by that Office.

BACKGROUND OF THE INVENTION

1. Field of the Invention

The present invention relates to a display system, more particularly, to a fingerprint recognizing display system including fingerprint recognizing means in a panel of a display apparatus and an operating method thereof, wherein a fingerprint of an user is read and a program supported by a computer is allowed to be operated only if the read fingerprint is registered in a fingerprint data base of the computer.

2. Description of the Prior Art

As the environment related to the Internet and the personal computer (PC) rapidly changes, there is an increasing problem that a hacker, i.e., an unauthorized user, can gain access to files, personal or company information on the computer which in turn can be damaged, downloaded or deleted. Additionally all the information in a computer can disappear because of a virus. Accordingly, it becomes necessary to be able to increase the security of the computer or other hosts, such as a terminal unit, network or network-based system to prevent the above problems.

To resolve the above problems, a computer connected to a network includes features such as required password access in order to protect the information therein. However, sometimes a password is chosen as a word easily guessed or a common word easily searched by a search program using dictionary data base. Therefore, an unauthorized user can discover the password and gain access to the data on the computer.

To resolve the problem regarding password protection, a fingerprint recognizing module has been applied to a computer system, wherein a fingerprint data base is established after obtaining the fingerprint of authorized users. Thus, when one desires to gain access to the data on the computer system, or operate a program therein, their fingerprint is compared to the data in the fingerprint data base before they are permitted to use the computer.

For example, such systems were disclosed in U.S. Pat. No. 5,838,306 to Clint O'Conner et al. and entitled Mouse With Security Feature and U.S. Pat. No. 5,420,936 to Greg P. Fitzpatrick et al. and entitled Method And Apparatus For Accessing Touch Screen Desktop Objects Via Fingerprint Recognition.

The invention disclosed in U.S. Pat. No. 5,420,936 provides touch-sensitive fields on a computer display for user selection. Upon selecting one of the fields with a fingertip, a fingerprint therefrom is analyzed and compared to a list of authorized fingerprints. Once the fingerprint passes inspection, the user is granted access to the underlying program. It is difficult, however, to apply this invention to a general monitor since a touch screen is required.

The invention disclosed in U.S. Pat. No. 5,838,306 utilizes a computer mouse as an input peripheral device which includes a window area integrally constructed within the mouse and positioned at an area on the mouse upon which a user normally places a finger in operating the mouse. The mouse further includes an illuminating device and a light sensitive detection device for providing a user signature signal representative of the characteristics of the ridge and valley pattern of the fingerprint of a finger placed upon the window area. The signature signal is transmitted to a BIOS within the computer system in which the mouse is operating and compared with one or more stored patterns which have previously been authorized for access to the computer system. When the users signature signal is compared with and matches one of the stored and approved signature signals, the system is enabled and the user is granted access. However, if a fingerprint recognizing module is included into a mouse, it is inconvenient to use the mouse because the weight and size of the mouse are increased.

Also, users often pick up the mouse to move it and in so doing they may drop the it. Thus, a fingerprint recognizing module or a fingerprint recognizing unit within the mouse may be damaged due to the shock caused by its being dropped, and a user's fingerprint may not be correctly recognized. In addition, some computer systems may not need a mouse, but in order to incorporate the fingerprint recognition disclosed in the U.S. Pat. No. 5,838,306 patent, one must buy the mouse having the features disclosed therein. Also, a fingerprint recognizing module is automatically changed at the time of changing a mouse according to the prior art, and the user is charged an unreasonable cost.

SUMMARY OF THE INVENTION

Therefore, an object of the present invention is to provide a fingerprint recognizing display system including fingerprint recognizing module into a panel of a display apparatus and an operating method thereof, wherein an user's fingerprint data is read, the read fingerprint data is transmitted to a computer main body by using a communication unit included in a fingerprint recognizing module of a display apparatus, and a program supported by the computer main body will be operated only if the fingerprint data transmitted from the display apparatus is included in the fingerprint data registered into the computer main body.

Another object of the present invention is to provide a fingerprint recognizing display system and an operating method thereof, wherein a panel of a display apparatus includes fingerprint recognizing module, the fingerprint recognizing module reads fingerprint data of the user, the read fingerprint data is transmitted to a computer main body by using its own communication protocol of the display apparatus, and a program supported from the computer can be operated only if the transmitted fingerprint data is registered in the computer main body.

To achieve the above objects, an apparatus according to the present invention comprises a display apparatus including a fingerprint recognizing module, recognizing a fingerprint of an user through the fingerprint recognizing module and outputting the recognized fingerprint data by using communication unit included in the fingerprint recognizing module, and a computer main body including a fingerprint data base having more than one fingerprint data and a fingerprint verifying unit, and operating a program after deciding whether fingerprint data input from the display apparatus is an approved fingerprint through the fingerprint data base and the fingerprint verifying unit.

Additionally, in a display system wherein a microprocessor of a display apparatus according to the present invention receives a video signal and a control signal from a video card of a computer main body in accordance with a communication protocol and outputs a video signal on a screen, the display apparatus includes a fingerprint recognizing module and recognizes the user's fingerprint through the fingerprint recognizing module, and the recognized fingerprint data is output to the microprocess through a communication protocol and to the computer main body in accordance with a communication protocol equipped between the display apparatus and the computer main body, and the computer main body comprises a fingerprint data base including more than one fingerprint and a fingerprint verifying unit, receives the fingerprint data input from the display apparatus through the communication protocol input to the video card and operates a program after deciding whether the input fingerprint is an approved fingerprint by the fingerprint data base and the fingerprint verifying unit, and then a program is operated.

Also, the display apparatus according to the present invention comprise further a front cover and fingerprint recognizing module placed in a side or front panel of the front cover.

Further, the display apparatus according to the present invention is characterized by integrating the fingerprint recognizing module to a power switch.

Further yet, a system operating method according to the present invention is characterized by including fingerprint data base in a computer main body and by driving the system only if fingerprint data transmitted to communication unit of the computer main body through the communication unit of a fingerprint recognizing module included in a display apparatus is registered in the fingerprint data base.

Yet further, a system operating method according to the present invention is characterized by including fingerprint data base in the computer main body and by driving the system only if fingerprint data transmitted to communication unit of the computer main body through its own communication protocol of a display apparatus is registered in the fingerprint data base.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 3 is applied.

FIG. 3 is applied.

FIG. 9 is a flowchart illustrating a routine encoding/decoding a file by using the present invention.

DETAILED DESCRIPTION OF THE PRESENT INVENTION

Hereinafter, a preferred embodiment of the present invention will be described in details with reference to the accompanying drawings. The term "display system" used in the present invention means a total system including a display apparatus 100 and a computer main body 200.

Figure 1:
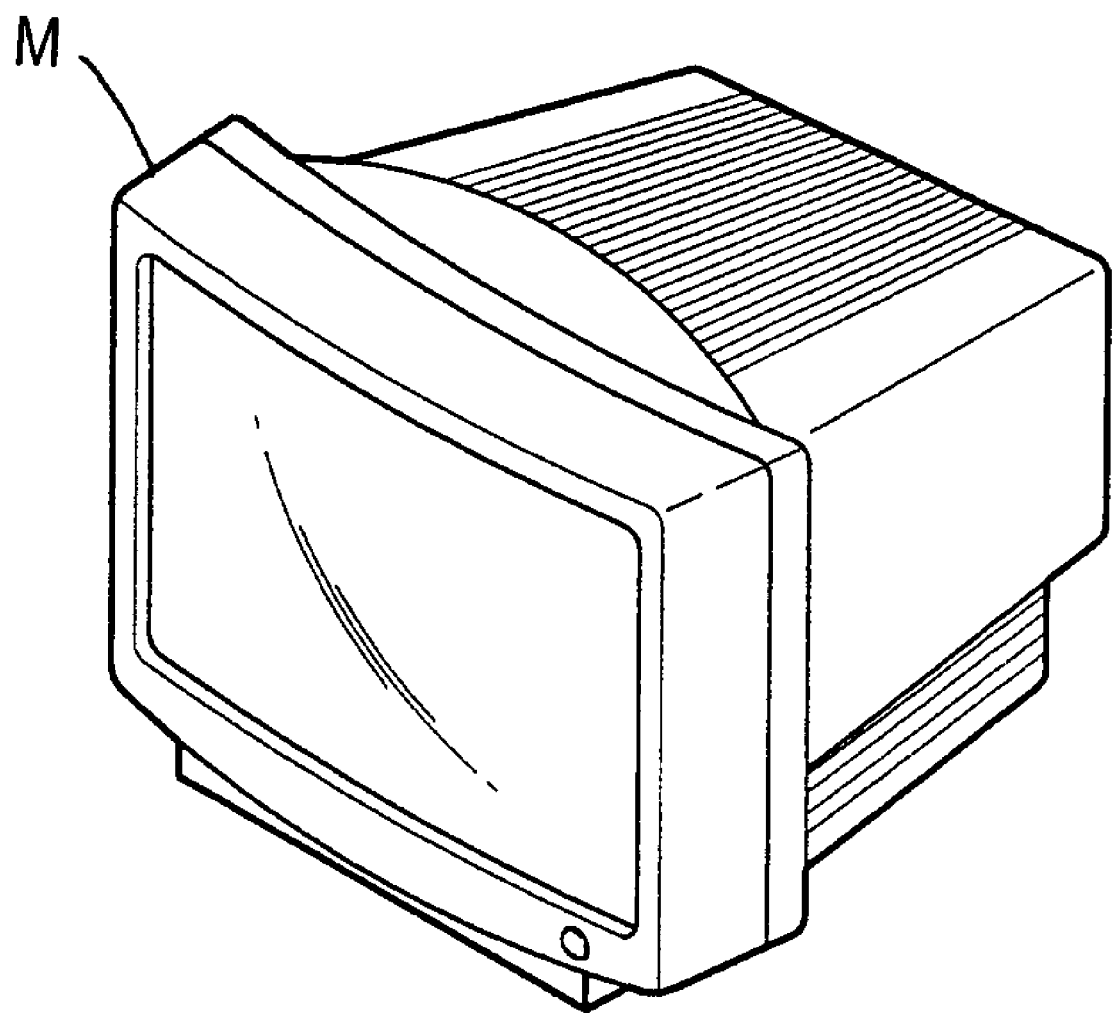
FIG. 1 is a perspective view illustrating a general monitor.
Figure 2:
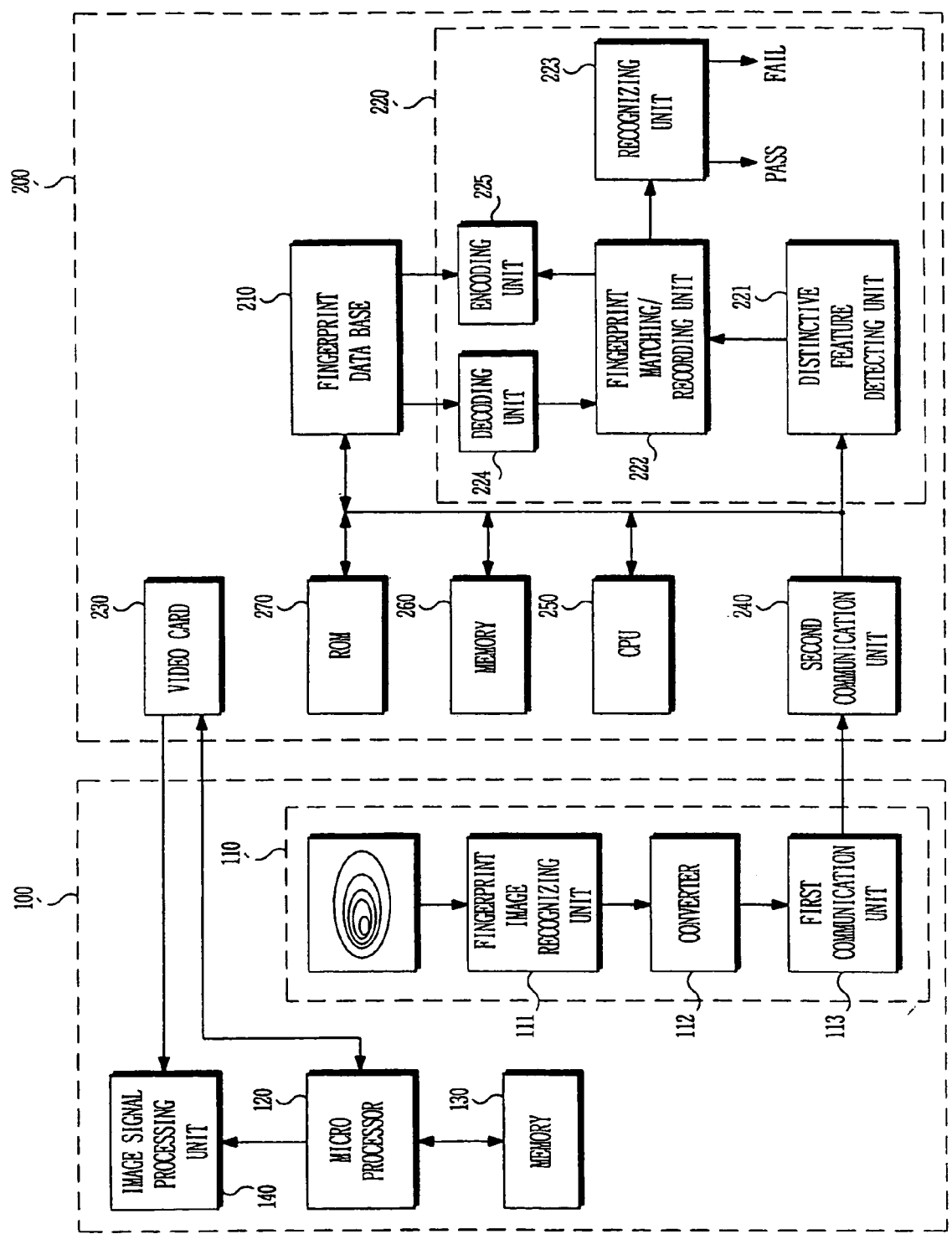
FIG. 2 is a view illustrating an embodiment according to the present invention.

FIG. 1 is a perspective view illustrating a general monitor M. FIG. 2 is a view illustrating an embodiment of the present invention. As shown in FIG. 2, a display system comprises a display apparatus 100 including a fingerprint recognizing module 110, recognizing an user's fingerprint through the fingerprint recognizing module 110 and outputting the recognized fingerprint data through a first communication unit 113 included in fingerprint recognizing module 110, and a computer main body 200 including a fingerprint data base 210 and fingerprint verifying unit 220, receiving fingerprint data output from display apparatus 100 through a second communication unit 240, deciding whether the input fingerprint data is an approved fingerprint data through fingerprint data base 210 and fingerprint verifying unit 220, and driving a program only if the input fingerprint data is approved.

Fingerprint recognizing module 110 in display apparatus 100 comprises a fingerprint image recognizing unit 111 providing a fingerprint sign of an user representing the user's fingerprint, a converter 112 converting analog fingerprint data input from the fingerprint image recognizing unit 111 to digital fingerprint data, and communication unit 113 outputting the digital fingerprint data to communication unit 240 in computer main body 200.

Fingerprint image recognizing unit 111 can be embodied by an optical sensing method using a prism or hologram sensing method and a non-optical sensing method using a sensor array, ultrasonic or magnetic sensing method.

The display apparatus 100 also comprises a memory 130, an image signal processing unit 140 and a microprocessor 120.

Fingerprint verifying unit 220 in computer main body 200 comprises a distinctive feature detecting unit 221 detecting a distinctive feature of the fingerprint data input by communication unit 240, a fingerprint matching/recording unit 222 decoding the encoded fingerprint data stored in the fingerprint data base 210 through a decoding unit 224, comparing the decoded fingerprint data with the fingerprint data input from distinctive feature detecting unit 221 and storing new fingerprint data into fingerprint data base 210 after encoding the same through an encoding unit 225 if any new fingerprint data is input through communication unit 240, and a recognizing unit 223 outputting a "pass" signal or a "fail" signal by using the result input from fingerprint matching/recording unit 222.

Computer main body 200 further comprises a video card 230, a central processing unit (CPU) 250, a memory 260, and a ROM 270.

Figure 3:
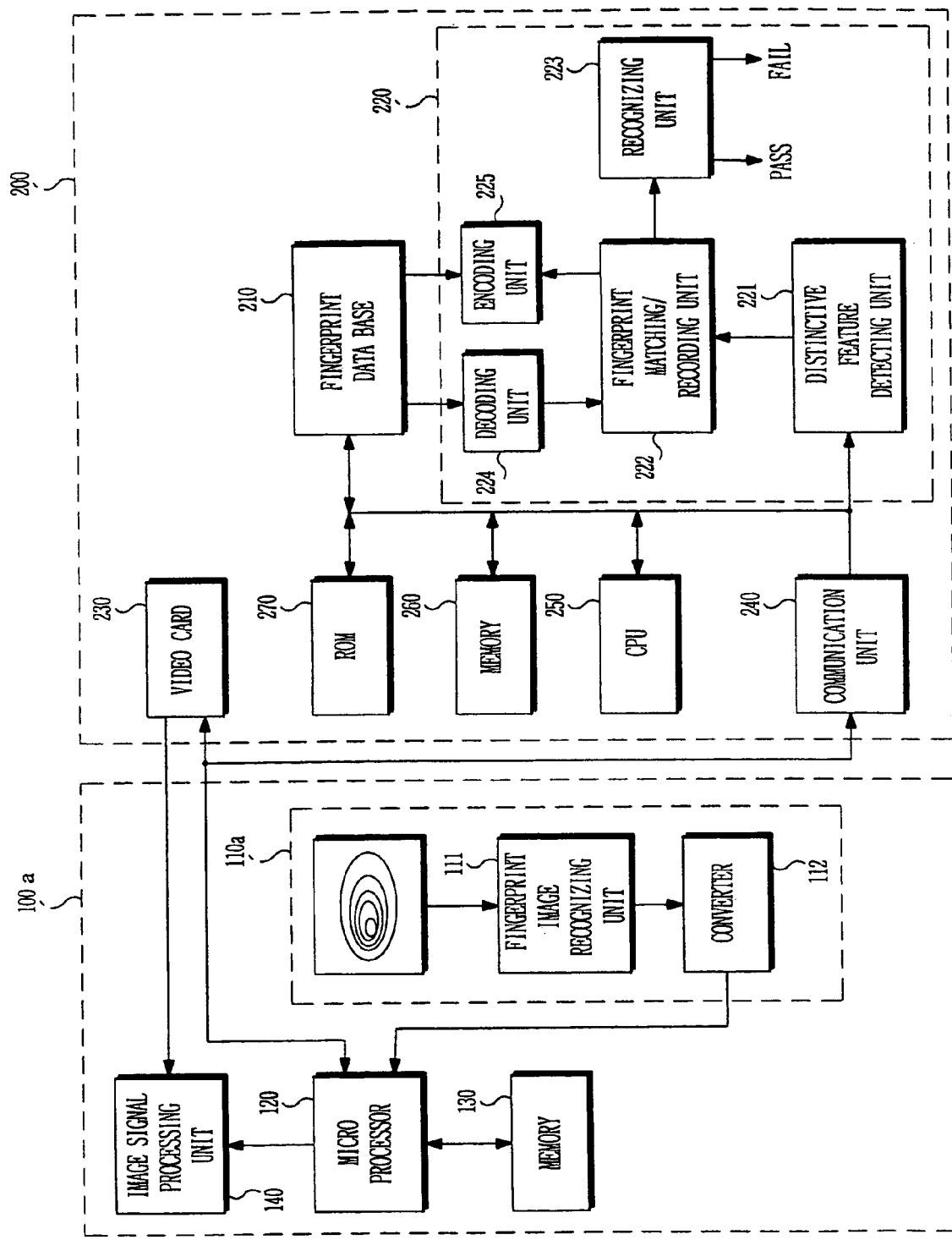
FIG. 3 is a view illustrating another embodiment according to the present invention.

FIG. 3 is a view showing another embodiment according to the present invention. As shown in FIG. 3, a display system comprises a display apparatus 100a which includes a fingerprint recognizing module 110a, recognizing the user's fingerprint through the fingerprint recognizing module 110a, receiving the recognized fingerprint data into microprocessor 120 and outputting the same to a computer main body 200 through its own communication protocol, wherein the computer main body 200, including fingerprint data base 210 and fingerprint verifying unit 220, receives the fingerprint data input from display apparatus 100 through a communication protocol input to video card 230 and drives a program only if the received fingerprint is approved by fingerprint data base 210 and fingerprint verifying unit 220.

Fingerprint recognizing module 110a comprises fingerprint image recognizing unit 111 providing a fingerprint sign of the user representing the user's fingerprint and converter 112 converting analog fingerprint data input from the fingerprint image recognizing unit 111 to digital fingerprint data and outputting the latter to microprocessor 120 included in display apparatus 100.

Figure 4:
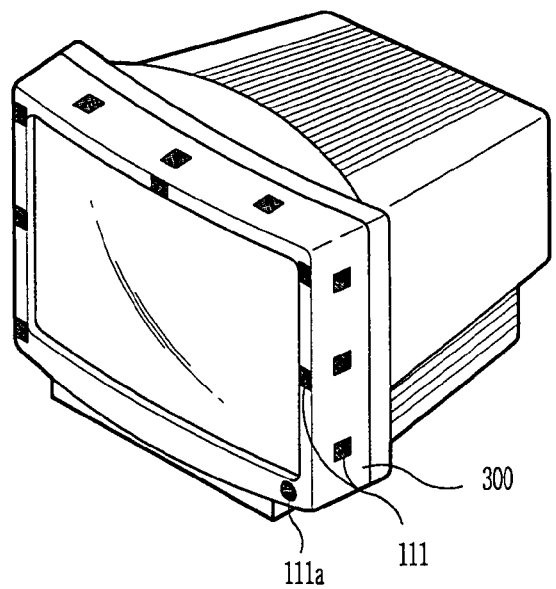
FIG. 4 is a perspective view illustrating a cathode ray tube (CRT) display unit to which a fingerprint recognizing part shown in FIG. 2
Figure 5:
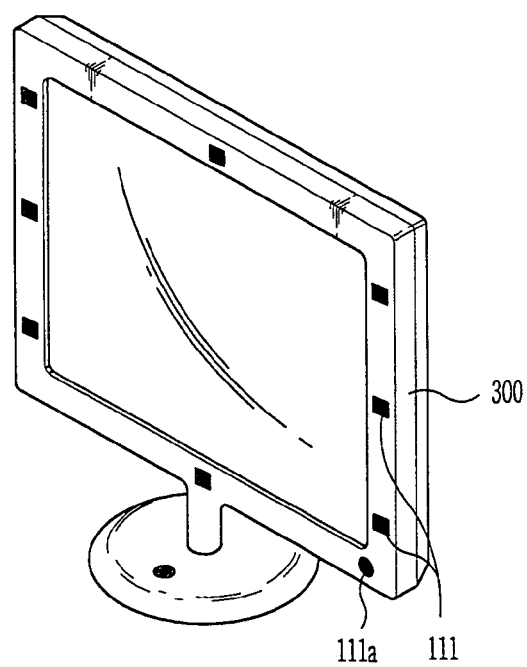
FIG. 5 is a perspective view illustrating a display apparatus for a liquid crystal display (LCD) to which a fingerprint recognizing part shown in FIG. 2

The fingerprint image recognizing unit 111 shown in FIGS. 2 and 3 can be applied to a CRT display apparatus or a display apparatus for a LCD as shown in FIGS. 4 and 5. In other words, the fingerprint image recognizing unit 111 reading the user's fingerprint is installed in a front cover 300 of a LCD or CRT display apparatus and a front or side panel of the front cover 300.

Additionally, the fingerprint image recognizing unit 111 is formed integrally at a power switch 111a and a power on/off signal of a display unit is output if the power switch 111a is deeply pressed. Generally, the power switch 111a is used as the fingerprint image recognizing unit 111 and reads the user's fingerprint if the user touches the power switch.

The other compositions of the display apparatus 100 and the computer main body 200 are not different from the above embodiment and will not be described in details.

An operation of the display system recognizing a fingerprint according to the present invention will be described with reference to the flowcharts shown in FIGS. 6–9.

Figure 6:
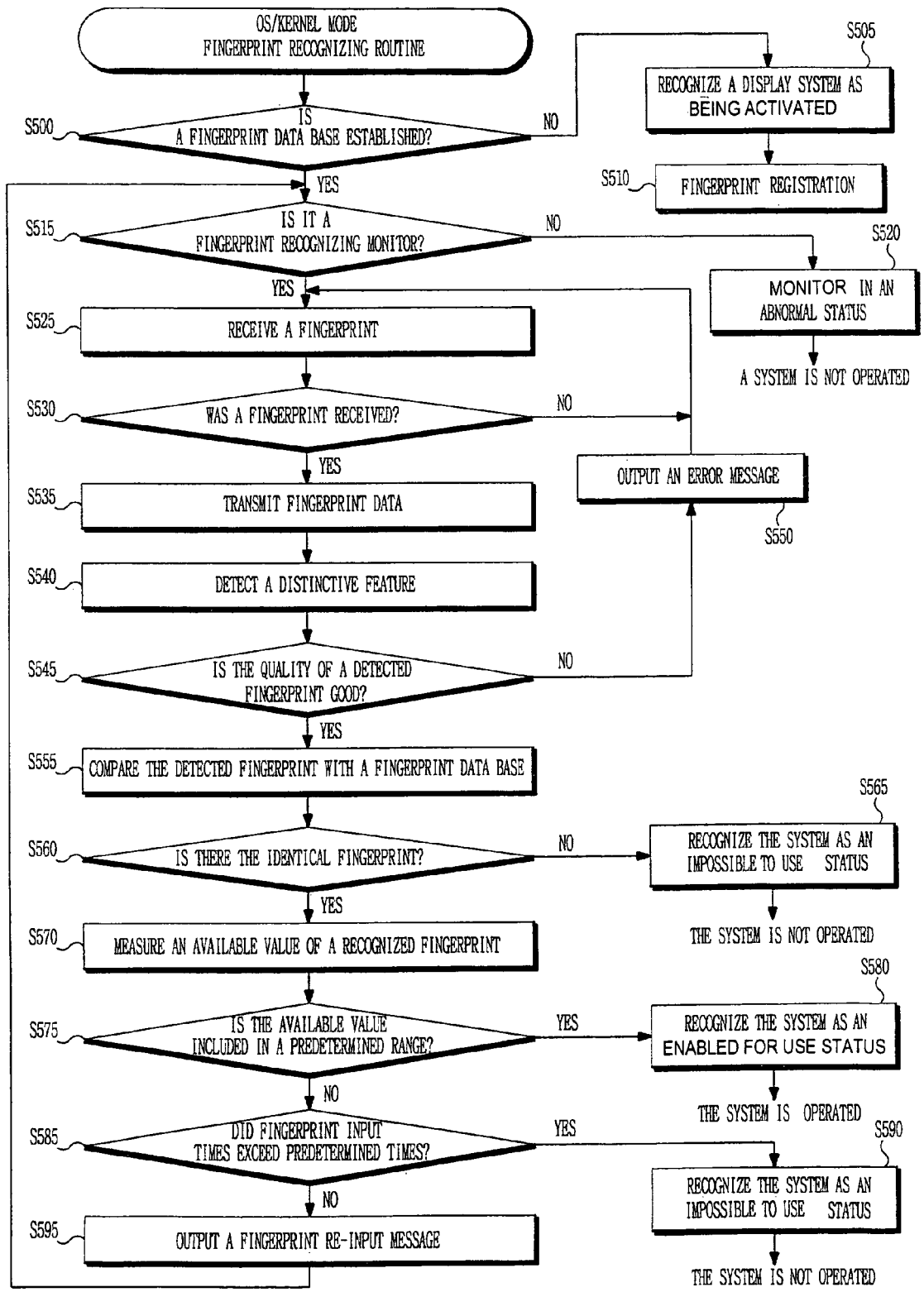
FIG. 6 is a flowchart illustrating steps according to the present invention applied to an operating system's (O/S) kernel mode.

FIG. 6 is a flowchart illustrating steps according to the present invention applied to an O/S kernel mode. When the user turns on the power of a display apparatus 100 and a computer main body 200, the computer main body 200 decides whether a fingerprint data base 210 is established (S500).

If the fingerprint data base 210 is not established, the computer main body 200 recognizes a display system as being activated, controls the total system to maintain the display system in an active state (S505). Thereafter, a fingerprint registration step (S510) is enabled and fingerprint data is registered (stored) in fingerprint data base 210.

When it is determined in step S500 that fingerprint data base 210 is established in the computer main body 200, the computer main body 200 decides whether a monitor, i.e., CRT or LCD, connected to the computer main body 200 is a fingerprint recognizing monitor (S515).

When it is determined in step S515 that the monitor is not a fingerprint recognizing monitor 100, the computer main body 200 recognizes (S520) the monitor as having an abnormal status and the total system is not operated (S520).

When it is determined in step S515 that the monitor is a fingerprint recognizing monitor, the fingerprint recognizing unit 111 reads a fingerprint of a user and decides whether the fingerprint image is normally received (S530). When it is determined that a fingerprint image is normally received, the normally received fingerprint image is converted to digital fingerprint data and transmitted to the computer main body 200 (S535). At this time, when the apparatus shown in FIG. 2 is used, the fingerprint data is transmitted to communication unit 240 in the computer main body 200 through communication unit 113 included in a fingerprint recognizing module 110. On the other hand, when the embodiment shown in FIG. 3 is used, the fingerprint data is output to microprocessor 120 in display unit 100 by using $I^2C$ ((IIC) Inter-IC bus), DDC (Display Data Channel) or USB (Universal Serial Bus) communication protocol. Then, microprocessor 120 outputs the fingerprint data to video card 230 by using its own communication protocol and communication unit 240 in the computer main body 200 receives the fingerprint data from a communication line of video card 230. When it is determined that a fingerprint image is not normally received, the process returns to step S525, and the user's fingerprint is again received.

The fingerprint data received by communication unit 240 is input to a distinctive feature detecting unit 221 and its distinctive feature is detected (S540). The quality of the detected fingerprint data (namely, rate of recognition) is measured (S545). If the quality is so poor that the detected fingerprint data can not be compared with the registered fingerprint data in the fingerprint data base 210, an error massage is output (S550), the process returns to the step S525, and the user's fingerprint is again received.

If the quality of the detected fingerprint data is good, the detected fingerprint data is compared with the registered fingerprint data in the fingerprint data base 210, and it is decided whether there is the identical fingerprint in the data base (S555 and S560).

If there is no identical fingerprint data in the registered fingerprint data base, the display system is recognized as having an impossible to use status and the system cannot be operated (S565). If there is an identical fingerprint data in the registered fingerprint data base, the available value of the recognized fingerprint is measured (S570).

It is then decided whether the measured available value of the fingerprint is included in a predetermined range (S575). If the measured available value of fingerprint is included in the predetermined range, the system is recognized as having an enabled for use status (S580) and the system can be operated by the user. If the measured available value of fingerprint is not included in the predetermined range, it is decided whether the user has attempted to input a fingerprint a number of times which exceeds a predetermined number of times (S585). That is, the user can attempt to input the fingerprint a predetermined number of times, and if the number of times of inputting a fingerprint exceeds a predetermined number of times, the system is recognized as having an impossible to use status and the system cannot be operated (S590). If it is determined that the number of times of inputting a fingerprint is not in excess of a predetermined number of times, a fingerprint re-input message is output (S595) and the process is returned to the step S515.

Figure 7:
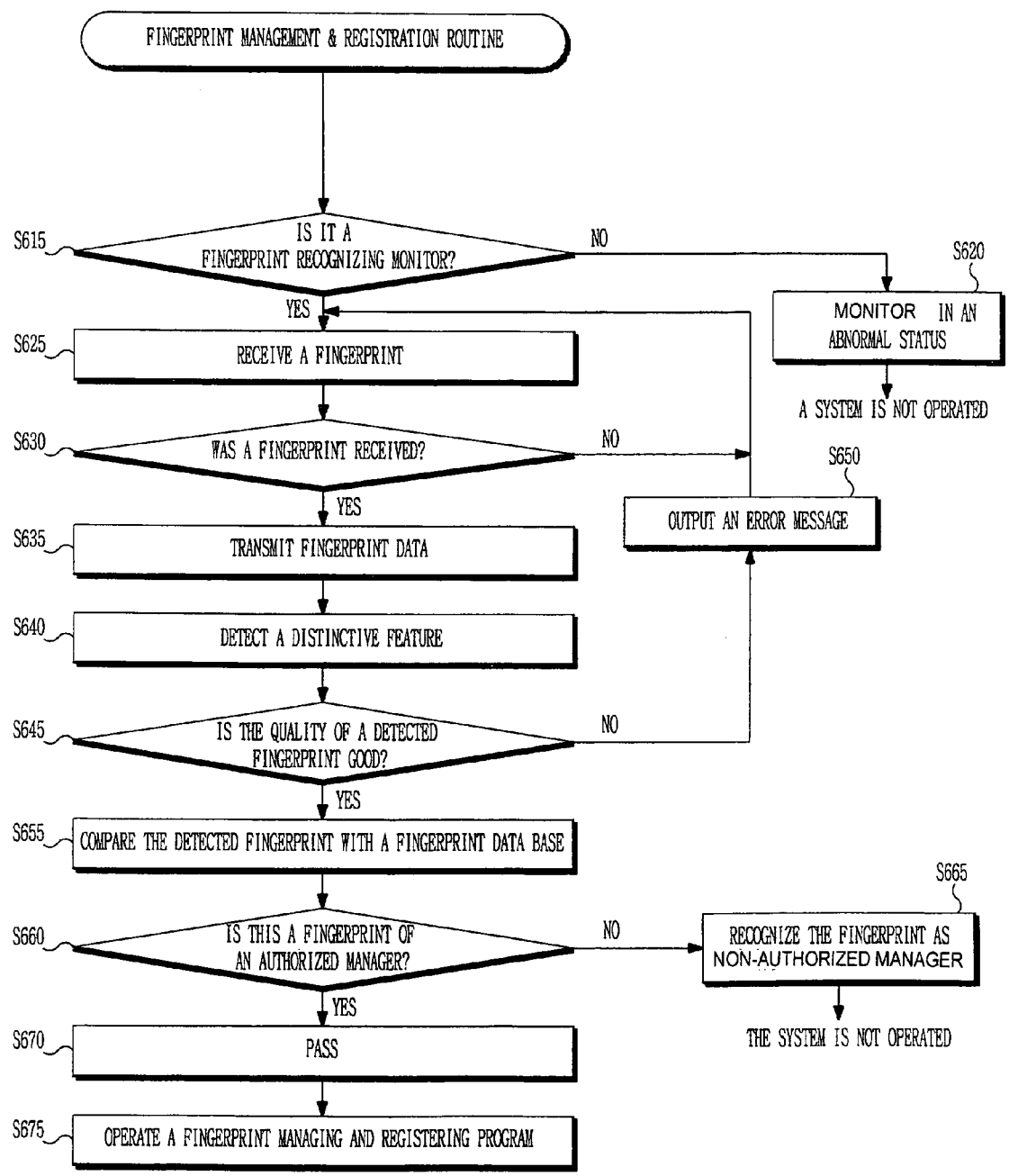
FIG. 7 is a flowchart illustrating a management and a registration of fingerprint data applied to the present invention.

FIG. 7 is a flowchart illustrating management and registration of fingerprint data applied to the present invention. As shown in FIG. 7, steps S615 to S655 are the same steps as steps S515 to S555 shown in FIG. 5, and will not be described in detail.

In the step S655, the read fingerprint data of an user is compared with the registered fingerprint data in the fingerprint data base 210 and it is decided whether the read fingerprint is a fingerprint of an authorized manager (S660). If it is a fingerprint of an authorized manager, the authorized manager is passed (S670) and the total system is controlled to operate a fingerprint managing and registering program (S675). If it is not a fingerprint of an authorized manager, the total system is controlled not to be operated since the system recognizes it as a non-authorized manager (S665).

Figure 8:
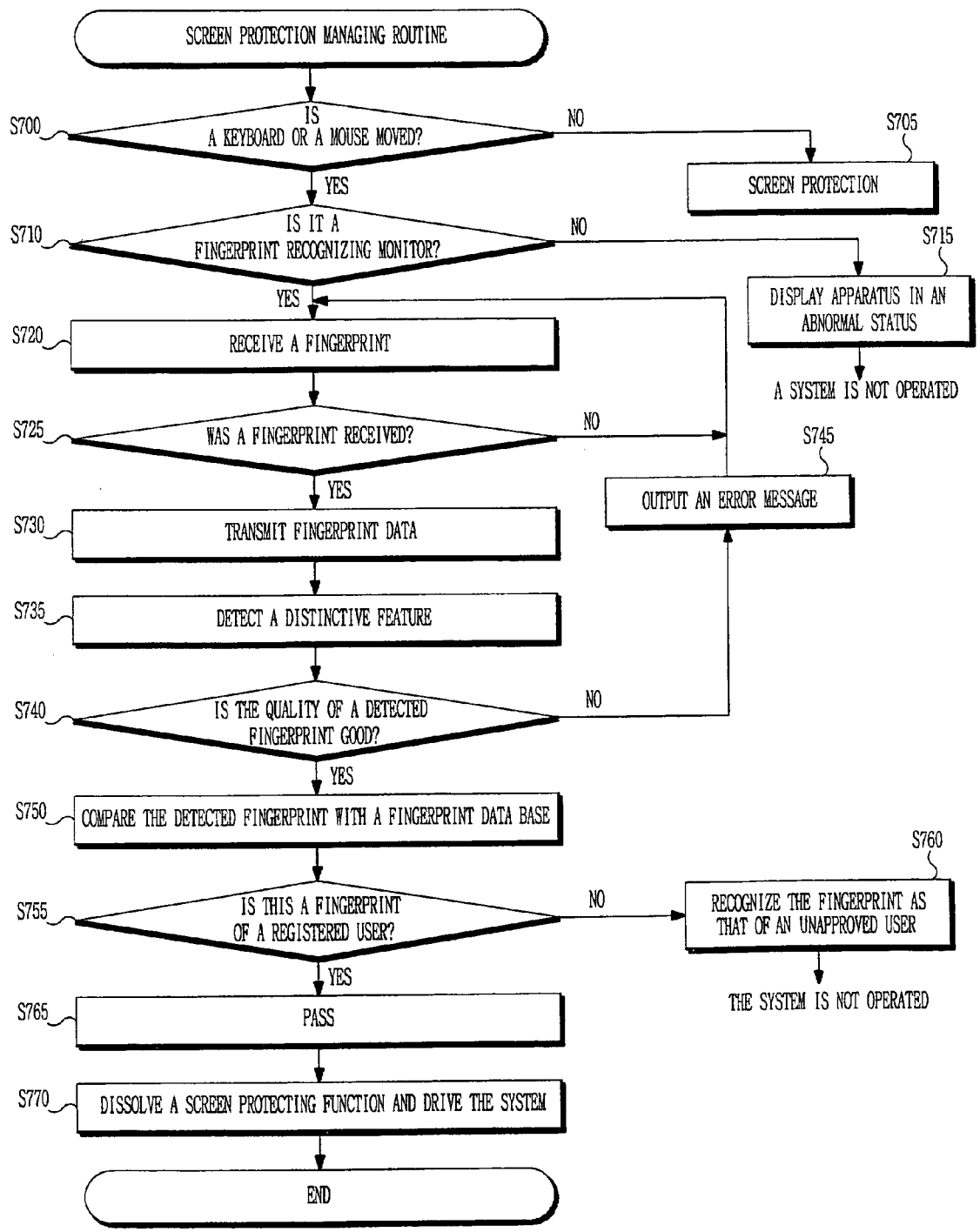
FIG. 8 is a flowchart illustrating steps according to the present invention applied to a screen protecting mode.

FIG. 8 is a flowchart illustrating a case applying the present invention to a screen protecting mode (known in the art) during which a screen is blank or a screen saver program is running. As shown in FIG. 8, it is decided whether a keyboard or a mouse is moved (S700). If the keyboard or the mouse is not moved, a screen protecting mode continues to operate (S705). If the keyboard or the mouse is moved, the routine proceeds with the step S710 to the step S750 which are the same steps as step S515 to step S555 of FIG. 5 and thus will not be described in detail.

Once the user's fingerprint data is read and compared with the registered fingerprint data in the fingerprint data base 210 in the steps S720–S750, it is decided whether it is a fingerprint of a registered user (S755). If the read fingerprint is a fingerprint of a registered user, the user is passed (S765) and the screen protecting mode is dissolved and the total system is controlled to be operated (S770). If it is not a fingerprint of a registered user, the total system is controlled not to be operated (S760).

FIG. 9 is a flowchart illustrating a routine encoding/decoding a file according to the present invention. As shown in FIG. 9, it is decided whether a file desired to executed is a file enabled to be encoded/decoded (S800). If the file can not be encoded/decoded, a impossible message is output and a file relevant to a system is executed (S805).

If the file can be encoded/decoded, steps S810 to S865 are performed. Steps S810 to S865 are the same as steps S710 to S765 shown in FIG. 8 and will not be described in detail.

When a user's fingerprint is recognized and passed, an encoding/decoding operation of the file is performed (S870) and the total system is normally operated.

As stated above, the present invention provides an effect of using easily and safely a fingerprint recognizing function by including a fingerprint recognizing function into a display apparatus which is the most important interface equipment for an user in a computer environment.

In addition, the present invention has an effect resolving a problem caused by a conventional mouse including a fingerprint recognizing function since a fingerprint recognizing function is included into a display apparatus.

In addition, the present invention allows only an authorized user to enter a computer system by including a fingerprint recognizing function into a display apparatus so that a terminal securing function and an encoding/decoding function of important files are provided. Also, a securing function can be more intensified by providing a function dissolving a screen protection through an input of fingerprint and a function approving an transaction through a fingerprint in an electronic commerce system later.

Although the preferred embodiment of the present invention has been described, it will be understood by those skilled in the art that the present invention should not be limited to the described preferred embodiment, but various changes and modifications can be made within the spirit and scope of the invention as defined by the appended claims.

What is claimed is:

1. A fingerprint recognizing display system comprising:
a monitor having a screen and a front cover surrounding said screen;
a fingerprint recognizing module included with said monitor, said fingerprint recognizing module including a fingerprint image recognizing unit disposed on a surface of said front cover, wherein a user desiring access to said fingerprint recognizing display system touches said fingerprint image recognizing unit; and
a computer main body including a fingerprint data base and a fingerprint verifying unit, wherein said fingerprint verifying unit compares fingerprint data transmitted from said fingerprint recognizing module to registered fingerprint data stored in said fingerprint data base and permits said user access to programs stored in said fingerprint recognizing display system when it is determined that the fingerprint of said user matches fingerprint data stored in said fingerprint data base, said computer main body comprising:
a kernel of an operating system of said computer main body for determining whether said fingerprint data base has been established in said computer main body; and
said kernel recognizing that said fingerprint recognizing display system has been activated and performing a fingerprint registration routine when it is determined that said fingerprint data base has not been established, and determining whether said monitor is a fingerprint recognizing monitor when it is determined that said fingerprint data base has been established.

2. The fingerprint recognizing display system as set forth in claim 1, wherein said fingerprint image recognizing unit is integrally formed with a power switch disposed on the surface of said front cover.

3. The fingerprint recognizing display system as set forth in claim 1, wherein said fingerprint recognizing module also includes:
a converter converting analog fingerprint data input from the fingerprint image recognizing unit to digital fingerprint data, and
a first communication unit transmitting the digital fingerprint data to a second communication unit in the computer main body.

4. The fingerprint recognizing display system as set forth in claim 3, wherein said fingerprint verifying unit includes:
a decoding unit for decoding the registered fingerprint data read from said fingerprint data base;
an encoding unit for encoding fingerprint data for storage into said fingerprint data base;
a distinctive feature detecting unit for detecting a distinctive feature of a fingerprint corresponding to the fingerprint data transmitted from said first communication unit to said second communication unit;
a fingerprint matching/recording unit for receiving decoded fingerprint data from said decoding unit and also for providing fingerprint data to said encoding unit, said fingerprint 11 matching/recording unit comparing decoded fingerprint data received from said decoding unit to said distinctive feature received from said distinctive feature detecting unit and also for outputting said distinctive feature received from said distinctive feature detecting unit to said encoding unit to be stored as the registered fingerprint data in said fingerprint data base; and
a recognizing unit outputting a "pass" signal or a "fail" signal in response to a comparison result output from said fingerprint matching/recording unit.

5. The fingerprint recognizing display system as set forth in claim 1, wherein said monitor includes a microprocessor communicating with a video card in said computer main body.

6. The fingerprint recognizing display system as set forth in claim 5, wherein said fingerprint recognizing module also includes:
a converter converting analog fingerprint data input from the fingerprint image recognizing unit to digital fingerprint data, and
said microprocessor transmits the digital fingerprint data to a communication unit in the computer main body.

7. The fingerprint recognizing display system as set forth in claim 6, wherein said fingerprint verifying unit includes:

a decoding unit for decoding the registered fingerprint data read from said fingerprint data base;
an encoding unit for encoding fingerprint data for storage into said fingerprint data base;
a distinctive feature detecting unit for detecting a distinctive feature of a fingerprint corresponding to the fingerprint data transmitted from said microprocessor to said communication unit;
a fingerprint matching/recording unit for receiving decoded fingerprint data from said decoding unit and also for providing fingerprint data to said encoding unit, said fingerprint matching/recording unit comparing decoded fingerprint data received from said decoding unit to said distinctive feature received from said distinctive feature detecting unit and also for outputting said distinctive feature received from said distinctive feature detecting unit to said encoding unit to be stored as the registered fingerprint data in said fingerprint data base; and
a recognizing unit outputting a "pass" signal or a "fail" signal in response to a comparison result output from said fingerprint matching/recording unit.

8. The fingerprint recognizing display system as set forth in claim 1, wherein said fingerprint verifying unit includes:
a decoding unit for decoding the registered fingerprint data read from said fingerprint data base;
an encoding unit for encoding fingerprint data for storage into said fingerprint data base;
a distinctive feature detecting unit for detecting a distinctive feature of a fingerprint corresponding to the fingerprint data transmitted from said monitor;
a fingerprint matching/recording unit for receiving decoded fingerprint data from said decoding unit and also for providing fingerprint data to said encoding unit, said fingerprint matching/recording unit comparing decoded fingerprint data received from said decoding unit to said distinctive feature received from said distinctive feature detecting unit and also for outputting said distinctive feature received from said distinctive feature detecting unit to said encoding unit to be stored as the registered fingerprint data in said fingerprint data base; and
a recognizing unit outputting a "pass" signal or a "fail" signal in response to a comparison result output from said fingerprint matching/recording unit.

9. The fingerprint recognizing display system as set forth in claim 1, wherein said monitor comprises a cathode ray tube display apparatus or a liquid crystal display apparatus.

10. A method of recognizing a fingerprint to enable a user to operate a computer system including a monitor and a computer main body, said method being embodied in an operating system kernel mode and comprising the steps of:
determining whether a fingerprint database has been established in said computer main body;
performing a fingerprint registration routine when it is determined that said fingerprint data base has not been established,
determining whether said monitor is a fingerprint recognizing monitor when it is determined that said fingerprint data base has been established;
detecting a fingerprint of the user when said user touches a portion of a front cover surrounding a display screen of said monitor of said computer system;
transmitting fingerprint data corresponding to said fingerprint of said user, when detected, from said monitor to said computer main body of said computer system;
comparing the fingerprint data transmitted from said monitor to registered fingerprint data output from said fingerprint data base, when said fingerprint data base has been established in said computer main body; and
enabling said computer system to be operated by said user when said comparing step indicates that there is a match between the fingerprint data transmitted from said monitor and the registered fingerprint data output from said fingerprint data base, or disabling said computer system to prevent operation by said user when said comparing step indicates that there is not a match between the fingerprint data transmitted from said monitor and the registered fingerprint data output from said fingerprint data base.

11. The method as set forth in claim 10, further comprising steps of:
determining that said monitor is operating in an abnormal status and preventing said computer system from being operated when it is determined that said monitor is not a fingerprint recognizing monitor, or performing said step of detecting a fingerprint when it is determined that said monitor is a fingerprint recognizing monitor.

12. The method as set forth in claim 11, further comprising steps of:
determining whether a keyboard or a mouse of said computer system is operated by said user during operation of a screen protection routine of said computer system; and
continuing to run a screen saver program when it is determined that neither said keyboard nor said mouse have been operated, or performing said step of determining whether said monitor is a fingerprint recognizing monitor when it is determined that one of said keyboard or said mouse have been operated.

13. The method as set forth in claim 12, further comprising a step of ending said screen protection routine when said comparing step indicates that there is a match between the fingerprint data transmitted from said monitor and the registered fingerprint data output from said fingerprint data base, and then performing said step of enabling said computer system to be operated by said user.

14. The method as set forth in claim 11, further comprising steps of:
determining whether a file stored in said computer system is enabled to be encoded or decoded during operation of a file encoding/decoding routine of said computer system;
outputting an message indicating said file can not be encoded or decoded when it is determined said file is not enabled to be encoded or decoded;
performing said step of determining whether said monitor is a fingerprint recognizing monitor when it is determined said file is enabled to be encoded or decoded; and
permitting said user to encode or decode said file when said comparing step indicates that there is a match between the fingerprint data transmitted from said monitor and the registered fingerprint data output from said fingerprint data base.

15. The method as set forth in claim 10, wherein said comparing step includes steps of:
checking said fingerprint data transmitted from said monitor and detecting distinctive features thereof;
determining whether the detected distinctive features are of good quality; and
outputting an error message when it is determined that the detected distinctive features are not of good quality and returning to said step of detecting a fingerprint of the user, or performing said comparing step when it is determined that the detected distinctive features are of good quality.

16. The method as set forth in claim 10, wherein said fingerprint registration routine comprises the steps of:
   detecting a fingerprint of a manager when said manager touches the portion of the front cover of said monitor of said computer system;
   transmitting fingerprint data corresponding to said fingerprint of said manager, when detected, from said monitor to said computer main body of said computer system;
   comparing the fingerprint data transmitted from said monitor to registered fingerprint data output from a fingerprint data base included in said computer main body; and
   permitting said manager to operate a fingerprint managing and registering program when said comparing step indicates that there is a match between the fingerprint data transmitted from said monitor and the registered fingerprint data output from said fingerprint data base, or disabling said computer system to prevent operation by said manager when said comparing step indicates that there is not a match between the fingerprint data transmitted from said monitor and the registered fingerprint data output from said fingerprint data base.

17. A method of recognizing a fingerprint to enable a user to operate a computer system including a monitor and a computer main body, said method being embodied in a kernel of an operating system of said computer main body and comprising the steps of:
   determining whether a fingerprint data base has been established in said computer main body;
   performing a fingerprint registration routine when it is determined that said fingerprint data base has not been established; and
   determining whether said monitor is a fingerprint recognizing monitor when it is determined that said fingerprint data base has been established.

18. The method as set forth in claim 17, wherein said fingerprint registration routine comprises the steps of:
   detecting a fingerprint of a manager when said manager touches a portion of a front cover of said monitor of said computer system;
   transmitting fingerprint data corresponding to said fingerprint of said manager, when detected, from said monitor to said computer main body of said computer system;
   comparing the fingerprint data transmitted from said monitor to registered fingerprint data output from a fingerprint data base included in said computer main body; and
   permitting said manager to operate a fingerprint managing and registering program when said comparing step indicates that there is a match between the fingerprint data transmitted from said monitor and the registered fingerprint data output from said fingerprint data base, or disabling said computer system to prevent operation by said manager when said comparing step indicates that there is not a match between the fingerprint data transmitted from said monitor and the registered fingerprint data output from said fingerprint data base.

19. The method as set forth in claim 17, further comprising steps of:
   detecting a fingerprint of the user when said user touches a portion of a front cover surrounding a display screen of said monitor of said computer system;
   transmitting fingerprint data corresponding to said fingerprint of said user, when detected, from said monitor to said computer main body of said computer system;
   comparing the fingerprint data transmitted from said monitor to registered fingerprint data output from said fingerprint data base, when said fingerprint data base has been established in said computer main body; and
   enabling said computer system to be operated by said user when said comparing step indicates that there is a match between the fingerprint data transmitted from said monitor and the registered fingerprint data output from said fingerprint data base, or disabling said computer system to prevent operation by said user when said comparing step indicates that there is not a match between the fingerprint data transmitted from said monitor and the registered fingerprint data output from said fingerprint data base.

20. The method as set forth in claim 17, further comprising steps of:
   determining that said monitor is operating in an abnormal status and preventing said computer system from being operated when it is determined that said monitor is not a fingerprint recognizing monitor, or performing said step of detecting a fingerprint when it is determined that said monitor is a fingerprint recognizing monitor.

* * * * *